United States Patent
Feyrer (10) Patent No.: US 9,751,175 B2
(45) Date of Patent: Sep. 5, 2017

(54) POSITIONING SYSTEM (71) Applicant: FESTO AG & Co. KG, Esslingen (DE)

(72) Inventor: Thomas Feyrer, Esslingen (DE)

(73) Assignee: FESTO AG & CO. KG, Esslingen (DE)

( * ) Notice: Subject to any disclaimer, the term of this patent is extended or adjusted under 35 U.S.C. 154(b) by 249 days.

(21) Appl. No.: 14/802,052

(22) Filed: Jul. 17, 2015

(65) Prior Publication Data
US 2016/0039061 A1 Feb. 11, 2016

(30) Foreign Application Priority Data

Aug. 6, 2014 (EP) ..................................... 14002756

(51) Int. Cl.
*B23Q 3/18* (2006.01)
*B23Q 1/62* (2006.01)
*B23Q 5/38* (2006.01)
*F16H 19/04* (2006.01)

(52) U.S. Cl.
CPC .............. *B23Q 3/18* (2013.01); *B23Q 1/621* (2013.01); *B23Q 5/385* (2013.01); *F16H 19/04* (2013.01)

(58) Field of Classification Search
CPC .. B25B 11/00; B23Q 3/00; B23Q 1/01; B23Q 3/067; B23Q 3/154
See application file for complete search history.

(56) References Cited

U.S. PATENT DOCUMENTS

| 4,409,860 | A | * | 10/1983 | Moriyama | B23Q 1/621 108/143 |
| 6,637,737 | B1 | * | 10/2003 | Beecherl | B23Q 1/5406 269/289 R |
| 8,783,674 | B2 | * | 7/2014 | Inoue | B65G 49/061 269/58 |
| 2009/0218510 | A1 | * | 9/2009 | Fujita | H01J 37/20 250/443.1 |
| 2016/0039061 | A1 | * | 2/2016 | Feyrer | B23Q 3/18 74/33 |

FOREIGN PATENT DOCUMENTS

| DE | 1920556 | 11/1969 |
| JP | 10267100 | 10/1998 |
| JP | 2006308525 | 11/2006 |
| WO | WO2007021109 | 2/2007 |

* cited by examiner

*Primary Examiner* — Lee D Wilson
(74) *Attorney, Agent, or Firm* — Hoffmann & Baron, LLP (57) ABSTRACT

A positioning system includes a slide support, on which is mounted a positioning slide, which can be driven to perform a positioning movement in a positioning plane with the aid of drive gears of the slide support, wherein the positioning plane is defined by a Cartesian x-y coordinate system. The drive gears are represented by at least one x-drive gear, which can cause a positioning movement in the x-axis direction, and at least one y-drive gear, which can cause a positioning movement in the y-axis direction. The drive gears are in engagement with a driven toothing structure of the positioning slide, which includes a plurality of driven teeth distributed in a punctiform arrangement in a regular two-dimensional tooth matrix. Although the drive gears are short, the positioning system facilitates a traverse of the positioning slide within a large positioning area.

20 Claims, 6 Drawing Sheets

POSITIONING SYSTEM

BACKGROUND OF THE INVENTION

The invention relates to a positioning system comprising at least one positioning slide which is variably traversable and positionable relative to a slide support of the positioning system while performing a positioning movement in a positioning plane defined by a Cartesian x-y coordinate system, wherein the slide support comprises at least one y-drive gear which can be driven by drive means of the positioning system to perform a drive rotary movement about an axis of rotation parallel to the x-axis of the coordinate system and at least one x-drive gear which can be driven by drive means to perform a drive rotary movement about an axis of rotation parallel to the y-axis of the coordinate system, wherein each y-drive gear and each x-drive gear has a drive toothing at its outer circumference and wherein the positioning slide has a driven toothing structure with which it is simultaneously in tooth engagement with the drive toothing of at least one x-drive gear and at least one y-drive gear during the positioning movement and can be driven to perform a positioning movement in the x-axis direction of the x-y coordinate system by rotating the at least one x-drive gear and to perform a positioning movement in the y-axis direction of the x-y coordinate system by rotating the at least one y-drive gear.

A positioning system of this type, which is known from DE 1920556 A, comprises a positioning slide in the form of a table top, which can be adjusted in two dimensions relative to a frame-shaped slide support in a positioning plane defined by a Cartesian coordinate system. Two drive gears with axes of rotation oriented at right angles to one another are rotatably mounted on the slide support. The axis of rotation of the one drive gear extends in the x-axis direction of the coordinate system, while the axis of rotation of the other drive gear extends in the y-axis direction of the coordinate system. In tooth engagement with each of these drive gears are several racks formed on the positioning slide and extending at right angles to one another while jointly forming a driven toothing structure. Both drive gears can be driven rotationally, the rotation of the drive gear having an axis of rotation parallel to the x-axis resulting in a displacement of the positioning slide in the y-axis direction, so that this drive gear can be referred to as y-drive gear. In a comparable way, the rotation of the drive gear having an axis of rotation parallel to the y-axis causes a displacement of the positioning slide in the x-axis direction, so that this drive gear can be referred to as x-drive gear. By the superimposed rotational movements of the x-drive gear and the y-drive gear, positioning movements of the positioning slide can be generated in which directions of movement in the x-axis direction and in the y-axis direction are superimposed on one another.

One disadvantage of the known positioning system is a relatively small positioning area of the positioning slide. Larger positioning areas can only be obtained by using suitably large drive gears and a corresponding voluminous slide support.

SUMMARY OF THE INVENTION

The invention is based on the problem of providing measures which allow for a large positioning area of the positioning slide while providing a simple structure combined with small dimensions of the drive gears.

To solve this problem, it is provided that, in combination with the features referred to above, the driven toothing structure of the positioning slide comprises a plurality of driven teeth distributed in a punctiform fashion in a plane parallel to the positioning plane, which are placed in a two-dimensional tooth matrix at the intersection points of mutually perpendicular x-grid lines and y-grid lines of an imaginary cross grid, wherein at least several of the driven teeth of the tooth matrix are capable of coming into tooth engagement with both the at least one x-drive gear and the at least one y-drive gear during the positioning movement of the positioning slide.

In this way, the components of the driven toothing structure which are responsible for the motion drive in the x-axis direction and in the y-axis direction are combined into a two-dimensional toothing unit which has a preferably regular tooth matrix composed of a plurality of driven teeth distributed two-dimensionally in a punctiform fashion in the manner of a matrix in a plane parallel to the positioning plane. The individual driven teeth lie at the intersection points of mutually perpendicular grid lines, of which some extend in the x-axis direction and are therefore identified as x-grid lines and the other extend in the y-axis direction and are therefore identified as y-grid lines. The cross grid lies in an x-y plane of the coordinate system with all of its grid lines. The resulting driven toothing structure could also be referred to as cross toothing. An essential aspect of the tooth matrix is that at least several and preferably all of the driven teeth are capable of coming into tooth engagement both with the x-drive gear and with the y-drive gear during the positioning movement of the positioning slide. This does obviously not happen simultaneously, but alternatively or consecutively.

The positioning slide can be displaced in the x-axis direction by means of the driven rotation of an x-drive gear and the resulting interaction between the drive toothing of the x-drive gear and the currently assigned driven teeth of the tooth matrix, wherein those driven teeth of the tooth matrix which are simultaneously in engagement with the drive toothing of the y-drive gear are guided for linear displacement in the x-axis direction by its drive toothing and slide along in the drive toothing of the y-drive gear. The reverse comparably occurs at a driven rotation of a y-drive gear. By means of a matching driven rotation of at least one x-drive gear in engagement with the driven toothing structure and a y-drive gear likewise in engagement with the driven toothing structure, the positioning slide can be displaced in the positioning plane in any desired direction of movement and at a variable speed. The possibility of the interaction of the driven teeth with both the at least one x-drive gear and the at least one y-drive gear facilitates the implementation of a relatively large positioning area of the positioning slide together with compact dimensions of the drive gears. It is particularly advantageous that the base area of the slide support can be used to optimum advantage in the positioning movement of the positioning slide; there is even the possibility of an arrangement in which the positioning slide projects beyond the edges of the slide support.

Advantageous further developments of the invention can be derived from the dependent claims.

As indicated above, it is advantageous if all of the driven teeth of the tooth matrix are capable of coming into tooth engagement with at least one x-drive gear and at least one y-drive gear at a time interval in the positioning movement of the positioning slide.

The cross grid defining the punctiform distribution of the driven gears expediently has a regular structure, the x-grid lines having the same distance from one another as the y-grid lines.

The driven toothing structure is expediently located at an underside of the positioning slide which faces the slide support.

It is advantageous if the at least one positioning slide rests loosely on the drive toothings of the drive gears with its driven toothing structure. The driven toothing structure preferably always rests simultaneously on at least one x-drive gear and at least one y-drive gear. Preferably, the driven toothing structure always rests simultaneously on precisely one x-drive gear and precisely one y-drive gear.

The positioning slide can in particular rest from above, with a drive toothing structure provided on its underside, on the upward-directed sections of the drive toothing of the drive gears. This offers the advantageous possibility of simply placing each positioning slide on the slide support from above during the assembly of the positioning system, so that it comes into tooth engagement with at least two drive gears. In the reverse process, the positioning slide can be removed from the slide support if required by simply lifting it off. The positioning slide expediently does not have any component which would engage a component of the slide support from below.

The at least one positioning slide is preferably designed as a product carrier which is loaded with at least one product which can be moved in the positioning movement and is to be positioned. The positioning slide can be provided with fastening means which facilitate a preferably releasable location of at least one product. However, it is also possible to use the positioning slide as a base support for an actual product carrier, which may for example be a micro-titre plate used for storing or transporting fluid samples.

The positioning slide preferably has a rectangular outline. The positioning slide is preferably plate-shaped and can represent a pallet.

The tooth matrix of the driven toothing structure expediently has a rectangular external contour with four edge regions arranged perpendicular to one another. It is expediently not bounded in any of the four edge regions, allowing unrestricted scope for carrying out the positioning movement.

All drive gears of the slide support preferably have the same diameter, the axes of rotation of these drive gears lying in a common plane which is parallel to the positioning plane and can be identified as axes plane.

The circumferential sections of the drive toothings of the various drive gears which face the positioning slide should lie together in a plane parallel to the positioning plane. It is, however, quite possible to provide drive gears with different diameters; in this case, the axes of rotation of these drive gears with different diameters would be placed at different distances from the positioning plane.

The slide support can be equipped with any number of x-drive gears and/or y-drive gears. If the slide support is provided with a larger number of x-drive gears and y-drive gears distributed over a large surface, a particularly large positioning area can be obtained in the positioning plane. In its positioning movement, the positioning slide can then successively come into engagement with different x-drive gears and/or y-drive gears and also be disengaged therefrom.

It has been found to be particularly advantageous if the slide support is provided with at least one pair of drive gears composed of an x-drive gear and a y-drive gear, these two drive gears being arranged in an L-shaped configuration in a plane parallel to the positioning plane. In this case, an axial end region of the x-drive gear is placed adjacent to an axial end region of the y-drive gear. If the slide support has a rectangular outline, at least one pair of drive gears is preferably placed such that the two drive gears extend along two side edges of the slide support which meet at a common corner point.

The slide support preferably comprises individual drive means for each drive gear. These drive means are preferably electromotive drive means, for example stepper motors or servomotors.

The drive gears of the slide support can expediently be driven to rotate independently of one another by their assigned drive means. The drive gears currently in engagement with the driven toothing structure, in particular, can optionally be driven in the same direction or in opposite directions, with both clockwise and anticlockwise rotation being possible. Moreover, different rotational speeds can be preset for the two drive gears, in particular such that the one drive gear is rotated at a speed which is different from that of the other drive gear. The positioning system expediently comprises control means which facilitate the matching drive of the drive gears in order to obtain a desired direction and speed of the positioning movement.

The slide support of the positioning system can be conceived as a single support unit which is provided with at least one x-drive gear and at least one y-drive gear, but is can also be provided as a multiple unit with an x-drive gear and/or a y-drive gear.

A modular structure of the slide support is considered to be particularly advantageous. Such a modular slide support comprises a plurality of support modules which can be or are lined up in a modular fashion in the x-axis direction and/or in the y-axis direction to form the slide support. Each of these support modules has at least one and preferably precisely one x-drive gear and at least one and preferably precisely one y-drive gear, each with associated drive means. Preferably, fastening means are provided for securing the lined-up support modules relative to one another; these fastening means may for example be screw fastening systems or latching systems. Together, the support modules form a module matrix representing the slide support. The modular structure facilitates by very simple means the provision of slide supports with different surface dimensions and/or different external contours for meeting application-specific requirements.

The advantageous features mentioned above in the context of the slide support apply to each individual support module of a modular structure.

All support modules of the slide support can be or are expediently interconnected electrically and/or fluidically and/or optically in order to greatly simplify the transmission of energy and/or data and/or signals required for their operation. Each support module can be provided with plugging means or other preferably releasable connecting means which facilitate a simple interconnection when assembling the support modules.

In a preferred embodiment of the positioning system, the base area of the driven toothing structure of at least one positioning slide, which contains the tooth matrix, is larger than the base area of the slide support or—in the case of a modular slide support structure—of each support module. This documents the good use of the area of the positioning system.

If the slide support is composed of a plurality of lined-up support modules, one and the same positioning slide can move across several and expediently across all of the support modules. By matching the operation of the drive gears of the individual support modules to one another, the positioning slide can be "transferred" between adjacent support modules in its positioning movement without any problems. By an integrated force measurement, for example, it can be detected when a positioning slide leaves a support module and comes into contact with a drive gear of an adjacent support module. In addition or as an alternative, other detection means can of course be provided for monitoring and processing the current position of the positioning slide.

At the edges, the slide support can define at least one transfer station suitable for moving positioning slides onto the slide support and/or for removing positioning slides from the slide support. It is possible to provide separate transfer stations for the feed-in and the removal of positioning slides. The slide support can also be combined with work stations where products transported by the positioning slide are handled in specific ways.

The driven toothing structure of the positioning slide expediently comprises a plurality of groove-like x-recesses which extend in the x-axis direction and are arranged side by side at a distance from one another in a plane parallel to the positioning plane and a plurality of groove-like y-recesses which extend in the y-axis direction and are arranged side by side at a distance from one another in a plane parallel to the positioning plane, the x-recesses and the y-recesses intersecting at right angles while laterally flanking the driven teeth combined in the two-dimensional tooth matrix and distributed in a punctiform fashion.

BRIEF DESCRIPTION OF THE DRAWINGS

The invention is explained in greater detail below with reference to the accompanying drawing, of which.

DETAILED DESCRIPTION

With reference to FIGS. 2 to 8, is should be said that the illustrated module can also represent an independent positioning system in which the whole of the slide support consists of a single support module which is not necessarily designed for lining up with further support modules. The whole slide support of the positioning system can in this case be represented by a single support module.

The positioning system identified as a whole by the reference number 1 comprises at least one positioning slide 2, which is mounted on a slide support 3 representing the base of the positioning system 1 and capable of being variably displaced and positioned relative to the slide support 3 while performing a positioning movement 4 illustrated by arrows.

Figure 3:
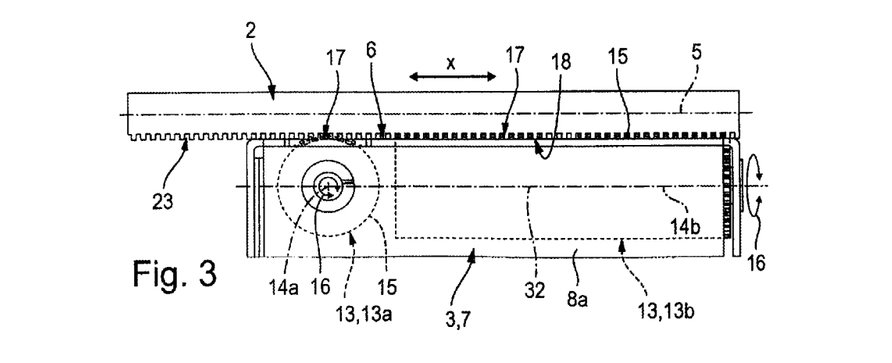
FIG. 3 is a side view of the arrangement from FIG. 2, viewed in accordance with arrow III.
Figure 4:
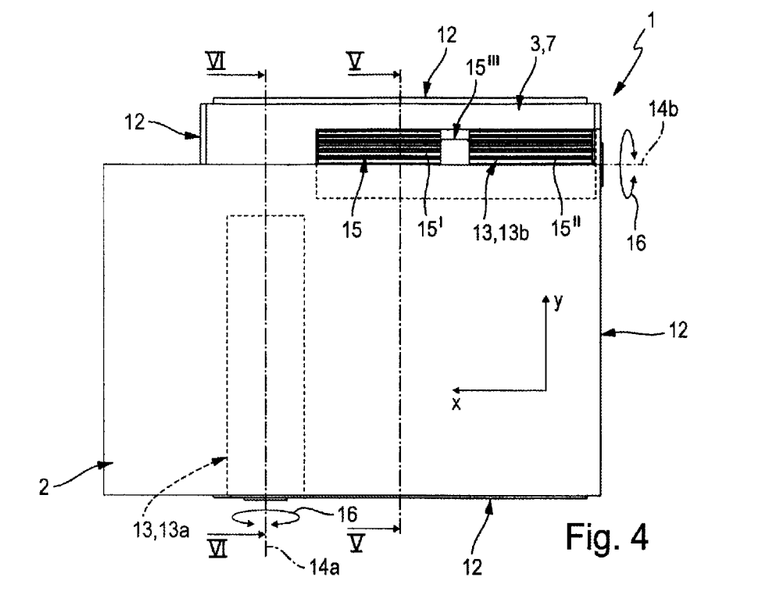
FIG. 4 is a top view of the arrangement from FIGS. 2 and 3, viewed in accordance with arrow IV from FIG. 2.
Figure 5:
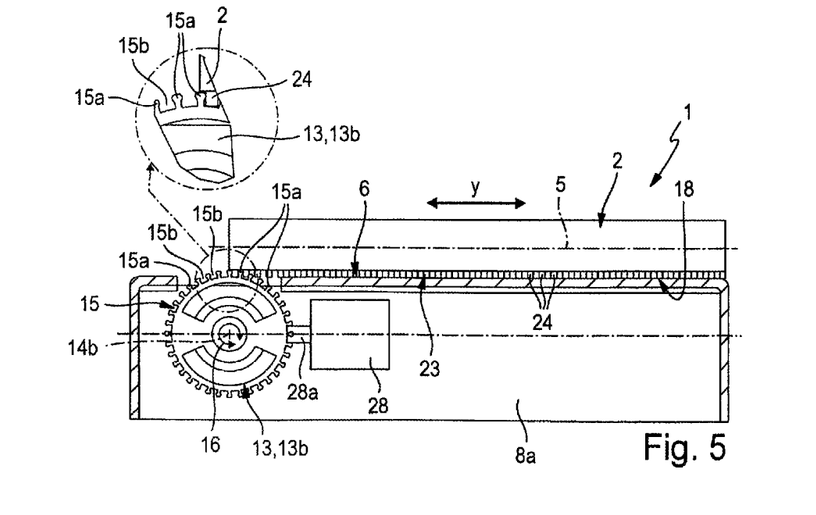
FIG. 5 is a section through the arrangement from FIGS. 2 to 4, in accordance with line V-V from FIG. 4.
Figure 6:
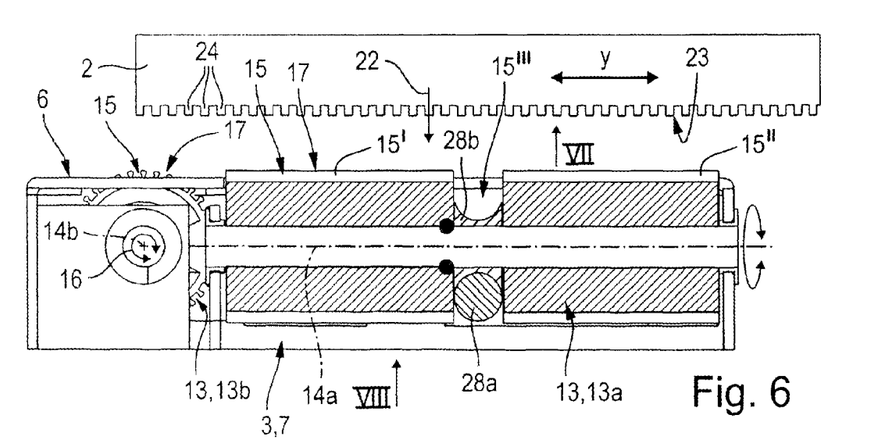
FIG. 6 is a section through the arrangement from FIGS. 2 to 5, in accordance with line VI-VI from FIG. 4, wherein the positioning slide is shown raised off the support module immediately before being placed on the support module.

The positioning plane 5 is defined by a Cartesian x-y coordinate system having an x-axis and a y-axis perpendicular to the former. In the following description, the direction of the x-axis will be described as the x-axis direction and the direction of the y-axis will be described as the y-axis direction. In FIGS. 1, 4, 7 and 8, the x-axis and the y-axis and therefore the positioning plane 5 extend parallel to the drawing plane. In FIGS. 3, 5 and 6, the positioning plane 5 extends perpendicular to the drawing plane.

In a commonly used orientation of the positioning system 1, the positioning plane 5 is defined by a horizontal plane.

The slide support 3 has a support top side 6, which points vertically upwards in the commonly used orientation of the positioning system 1. The at least one positioning slide 2 is placed on the support top side 6 on the slide support 3.

Figure 1:
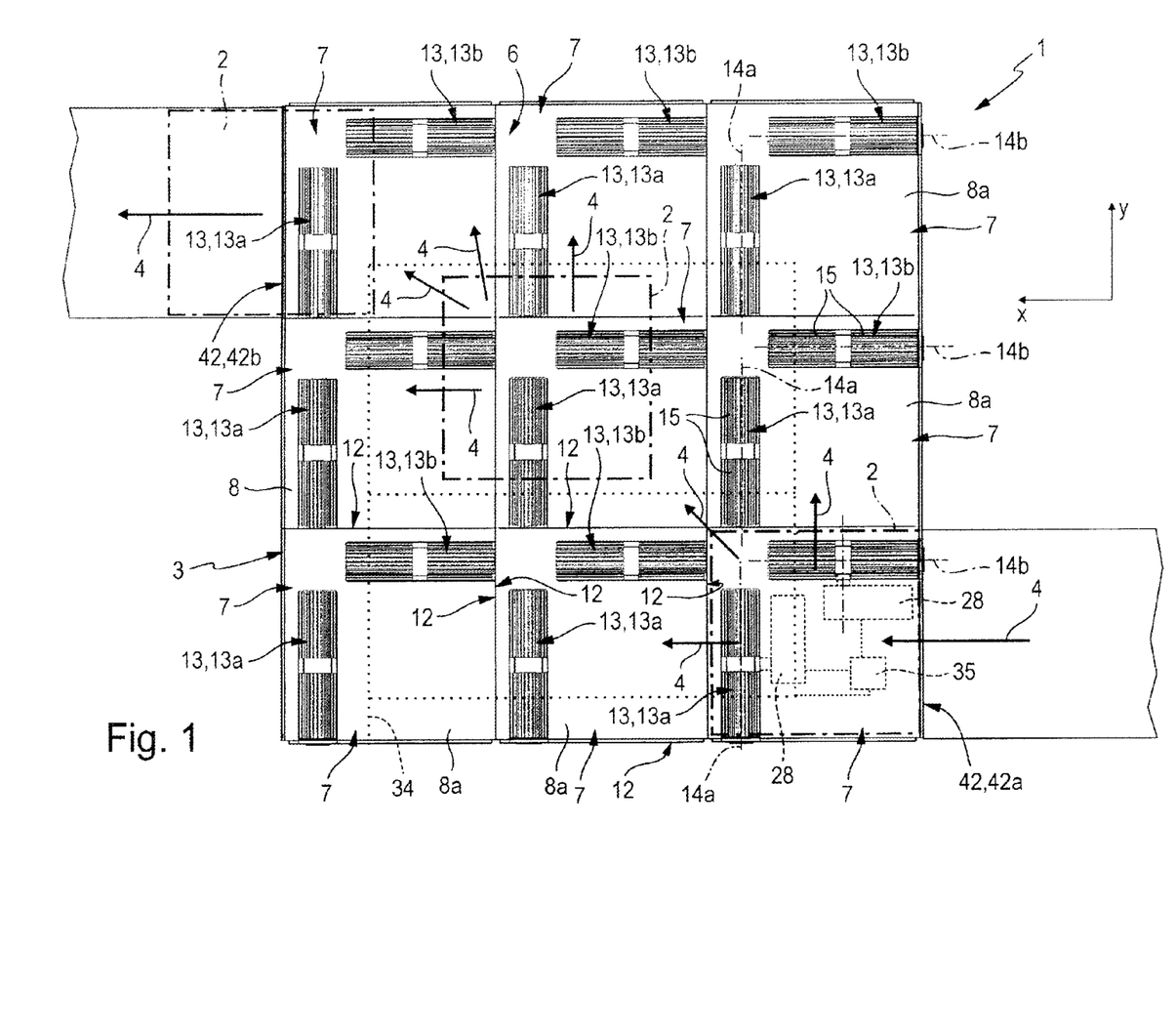
FIG. 1 is a top view of a preferred embodiment of the positioning system according to the invention, viewed perpendicular to an x-y plane, wherein several positioning slides are indicated by dot-dash lines only for clarity and wherein the slide support has a modular structure, being composed of a plurality of support modules lined up in two dimensions.
Figure 2:
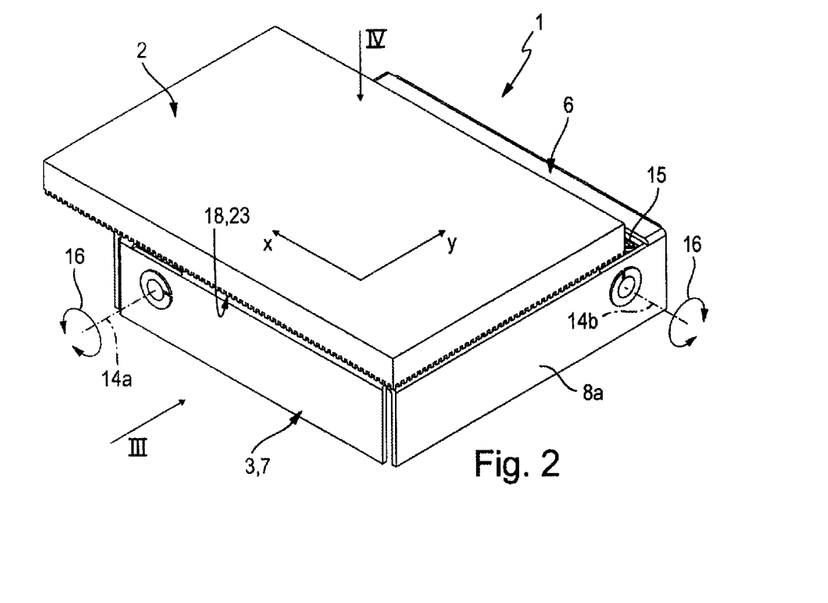
FIG. 2 shows a section of the positioning system from FIG. 1, with only one of the support modules of the positioning system with a positioning slide placed thereon being shown in an isometric representation.

FIG. 1 shows the positioning system 1 with a plurality of positioning slides 2, which are indicated by dot-dash lines only for clarity. In principle, any number of positioning slides 2 can be used. The positioning system 1 may even be fitted with only one positioning slide 2. References to one positioning slide 2 should in the following description be understood as references to all of the positioning slides 2 provided.

The slide support 3 expediently has a modular structure and is composed of a plurality of individual support modules 7. These support modules 7 can, while forming a two-dimensional module matrix in the x-y plane, be lined up in any preferred arrangement and in particular coupled to one another mechanically, resulting in a coherent structure.

The slide support 3 has a preferably plate-shaped base body structure 8. Each support module 7 has a base body 8a, and the support modules 7 can be lined up in a modular fashion by their base bodies 8a, so that several lined-up base bodies 8a together form the base body structure 8.

Each base body 8a preferably has a rectangular outline, which is preferably square as in the illustrated embodiment. Each base body 8a preferably has four lateral outer surfaces 12, which extend at right angles to one another and define the layout of the base body 8a.

Within the modular slide support 3, the support modules 7 are oriented such that in each case two opposite lateral outer surfaces 12 are oriented in the x-axis direction, while the two other opposite lateral outer surfaces 12 are oriented in the y-axis direction.

To form the slide support 3, the support modules 7 can be or are fitted to one another in pairs by the lateral outer surfaces 12 of their base bodies 8a. This allows the formation of a slide support 3 composed of any number of support module rows 7 extending in the x-axis direction and any number of support module rows extending in the y-axis direction. Each of the four outer surfaces 12 is preferably suitable for mounting a further support module 7, so that not only regular bur also irregular distribution patterns of support modules 7 can be implemented.

The slide support 3 is equipped with several gears which fulfil a driving function for the positioning slide 2 and are therefore identified as drive gears 13. At least one of the drive gears 13 is responsible for moving the positioning slide 2 in the x-axis direction and will therefore be identified as x-drive gear 13a. At least one other drive gear 13 is responsible for moving the positioning slide 2 in the y-axis direction and will therefore be identified as y-drive gear 13b.

Each x-drive gear 13a is capable of rotating relative to the base body structure 8 about a first axis of rotation 14a, which extends parallel to the y-axis. Each y-drive gear 13b is capable of rotating relative to the base body structure 8 about a second axis of rotation 14b, which extends parallel to the x-axis. All drive gears 13 are rotatably mounted on the base body structure 8 either directly or indirectly.

At its peripheral outer circumference, each drive gear 13 has an external toothing identified as drive toothing 15 in the following description. This is in each case a straight toothing, wherein each tooth 15a of the drive toothing 15 and each interstice 15b between two teeth 15a of the drive toothing 15 has a longitudinal dimension parallel to the associated axis of rotation 14a, 14b.

In the drive gears 13 of the illustrated embodiment, the drive toothing 15 is axially segmented and comprises two axially spaced toothing sections 15', 15", which is related to the fact that the torque required for generating a rotary movement 16 of the respective drive gear 13 is introduced into the drive gear 13 in the interstice 15''' formed between the two toothing sections 15', 15". However, the torque causing the rotary movement 16 can also be introduced in a different way.

All drive gears 13 are arranged such that they project beyond the base body structure 8 on the support top side 6 with at least one circumferential section of their drive toothing 15. These upward-projecting circumferential sections of the drive toothings 15 are the actual drive sections 17 of the drive gears 13, which cooperate with the positioning slide 2 for driving it. As a whole, the drive gears 13 are oriented such that all drive sections 17 lie in a common x-y plane, i.e. in a plane parallel to the positioning plane 5.

Each positioning slide 2 is placed on the slide support 3 with its underside 18 leading in accordance with arrow 22 in FIG. 6. As a result, the underside 18 of the positioning slide 2 and the top side 6 of the slide support 3 face one another in a vertical direction perpendicular to the x-y plane, which could also be identified as z-axis direction.

On its underside 18, the positioning slide 2 has a toothing structure which—as it is used as an output drive for the positioning slide—shall be identified as driven toothing structure 23. It could also alternatively be identified as output toothing structure 23. This driven toothing structure 23 is in tooth engagement with the drive section 17 of the drive toothing 15 of at least one x-drive gear 13a and at least one y-drive gear 13b in every position the positioning slide 2 adopts relative to the slide support 3. The initial tooth engagement is established very simply when the positioning slide 2 is vertically placed on the slide support 3. In this context, it is advantageous if the positioning slide 2 with its driven toothing structure 23 lies on the drive toothings 15 of the drive teeth 13 located below only loosely, based only on its weight and the weight of any load. If required, this facilitates a quick removal if a positioning slide 2 from the slide support 3. In this way, the slide support 3 can be equipped with any number of positioning slides 2 in a very time-saving way.

The driven toothing structure 23 is designed in a very special way. It comprises a plurality of driven teeth 24 designed in the manner of projections, which are arranged in a punctiform fashion in the x-y plane with regular two-dimensional distribution. All of the driven teeth 24 together therefore define a two-dimensional tooth matrix 25, which is composed of a plurality of linear tooth rows, each comprising a plurality of driven teeth, each extending in the x-axis direction and being evenly spaced in the y-axis direction. The driven teeth 24 alternatively could also be identified as output teeth 24.

Figure 7:
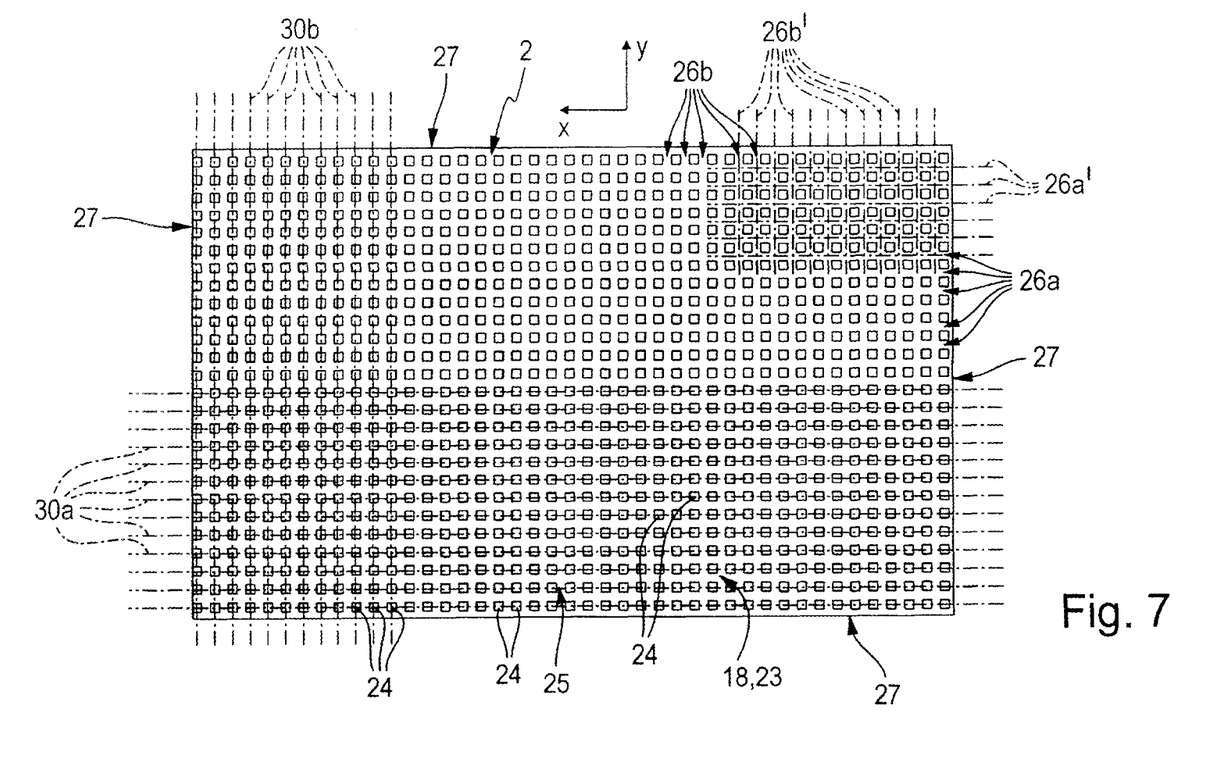
FIG. 7 is a bottom view of the positioning slide, showing the driven toothing structure in the direction of arrow VII from FIG. 6.
Figure 8:
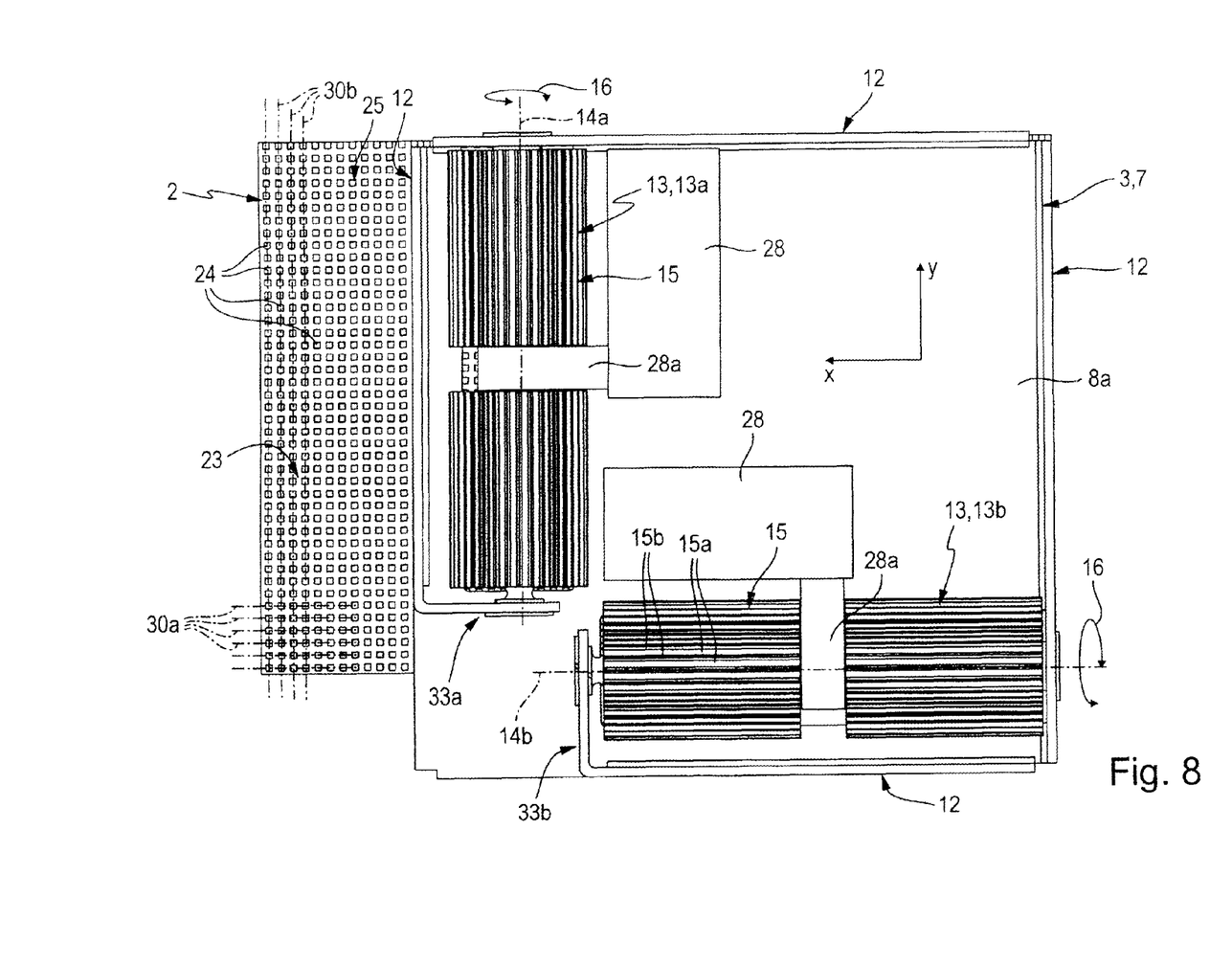
FIG. 8 is a bottom view of the arrangement from FIGS. 1 to 6, viewed in accordance with arrow VIII from FIG. 6.

In other words, the individual driven teeth 24 are placed on intersection points of an imaginary cross grid illustrated in FIGS. 7 and 8, which comprises a plurality of mutually parallel x-grid lines 30a and a plurality of mutually parallel y-grid lines 30b, the x-grid lines 30a extending in the x-axis direction and the y-grid lines 30b extending in the y-axis direction. The x-grid lines 30a intersect the y-grid lines 30b at a right angle, all lying in one and the same x-y plane. The spacing between adjacent x-grid lines 30a is preferably equal, as is the spacing between adjacent y-grid lines 30b. In addition, the spacing between adjacent x-grid lines 30a is preferably equal to the spacing between adjacent y-grid lines 30b. Each driven tooth 24 is spaced identically relative to the driven teeth 24 adjacent in the x-axis direction and the y-axis direction.

The driven teeth may for example have a stud shape or the shape of a truncated cone or pyramid. The shape of a truncated pyramid is expediently based on a regular four-sided pyramid shape.

Between rows of driven teeth 24 placed adjacent to one another in the y-axis direction—identified as x-tooth rows in the following description—there is expediently provided a groove-like recess extending in the x-axis direction, which shall be identified as x-recess 26a on the basis of its orientation. Each of these x-recesses 26a has a longitudinal axis 26a' extending in the x-axis direction. Furthermore, between rows of driven teeth 24 placed adjacent to one another in the x-axis direction—identified as y-tooth rows in the following description—there is provided a groove-like recess extending in the y-axis direction, which shall be identified as y-recess 26b on the basis of its orientation. Each of these y-recesses 26b has a longitudinal axis 26b' extending in the y-axis direction. All x-recesses 26a and all y-recesses 26b extend in an x-y plane parallel to the positioning plane 5, being expediently arranged in a common x-y plane.

As FIG. 7 shows particularly clearly, the x-recesses 26a and the y-recesses 26b intersect at right angles, the points of intersection being spaced equally. All driven teeth 24 apart from the driven teeth 24 at the edge of the tooth matrix 25 are laterally flanked by two x-recesses 26a and two y-recesses 26b.

The driven toothing structure 23 expediently has a rectangular external contour in the x-y plane. Viewed from the top, the positioning slide 2 preferably has a rectangular outline, the driven toothing structure 23 extending to all four lateral edge regions 27 of the positioning slide 2. The driven toothing structure 23 is unbounded in all four lateral edge regions 27, which means that both the x-recesses 26a and the y-recesses 26b are open at the end faces.

When the positioning slide 2 is placed on the slide support 3, some of the driven teeth 24 of the driven toothing structure 23 engage with the tooth interstices 15b of an x-drive gear 13a and some further driven teeth 24 engage with the tooth interstices 15b of a y-drive gear 13b. At the same time, teeth 15a of the x-drive gear 13a and 15b of the y-drive gear 13b engage with an x-recess 26a or a y-recess 26b of the driven toothing structure 23.

If the x-drive gear 13a is now made to rotate, it displaces the positioning slide 2 in the x-axis direction owing to the tooth engagement, while at the same time the tooth interstices 15b of the y-drive gear 13b act as guide grooves in which the meshing driven teeth 24 are guided for linear displacement. In a comparable way, a rotary movement 16 of the y-drive gear 13b causes a positioning movement 4 of the positioning slide 2 in the y-axis direction, the drive toothing 15 of the x-drive gear 13a in combination with the meshing driven teeth 24 causing a linear guidance of the positioning slide 2 in the y-axis direction.

The slide support 3 is equipped with separate drive means 28 for each drive gear 13. With the aid of these drive means 28, the associated drive gear 13 can optionally be driven to perform the rotary movement 16 either clockwise or anticlockwise, preferably at a variable speed in either case. By suitably matching the control of the drive means 28, the direction of the positioning movement 4 can be predetermined. This offers not only the possibility of moving a positioning slide 2 optionally in the x-axis direction or in the y-axis direction, but it also facilitates movement in any other direction and form within the positioning plane 5.

The drive means 28 are preferably of the electromotive kind, for example comprising an electric motor designed as a stepper motor or a servomotor for each drive gear 13. Coupling to the associated drive gear is, for example, based on a worm 28a capable of rotary movement, which is in engagement with a worm gear 28b of the drive gear 13 placed in the interstice 15'''.

The fact that the drive gears 13 can be driven to rotate independently of one another offers the possibility of placing several positioning slides 2 at the same time on a slide support 3 equipped with several x-drive gears 13a and several y-drive gears 13b and of moving and positioning them independently of one another. The punctiform distribution of the driven teeth 24 at the intersection points of a regular cross grid allows the same driven teeth 24 to come into tooth engagement alternatively both with an x-drive gear 13a and with a y-drive gear 13b in the positioning movement 4 of the positioning slide 2. Although each driven tooth 24 is never in simultaneous engagement with an x-drive gear 13a and with a y-drive gear 13b, at least some and preferably all driven teeth 24 can temporarily come into engagement with an x-drive gear 13a and then with a y-drive gear 13b. The driven teeth 24 of the driven toothing structure 23 are therefore not specifically assigned to either an x-drive gear 13a or a y-drive gear 13b, but can cooperate both with an x-drive gear 13a and with a y-drive gear 13b, depending on the position of the positioning slide 2. As a result, the positioning slide 2 covers a relatively large positioning area in the x-y plane even if the drive gears 13 are relatively short. In other words, the positioning area of the positioning slide 2 is not predetermined by the size of the drive gears 13, but by the surface area of the tooth matrix 25.

This being so, the base area of the driven toothing structure 23 containing the tooth matrix 25 can be made larger than the base area of the slide support 3 or of each support module 7. This means that the positioning slide 2 can in its positioning movement easily adopt positions in which it projects beyond the lateral edge of the slide support 3 or of a support module 7.

All drive gears 13 of the slide support 3 preferably have the same diameter. This results in an optimum cooperation with the driven toothing structure 23 for all drive gears 13. The axes of rotation 14a, 14b of all drive gears 13 having the same diameter lie in a common plane to be identified as axes plane 32, which is oriented parallel to the positioning plane 25.

It is, however, also possible to choose different diameters for several drive teeth 13, if the associated axes of rotation are then located at different levels at the slide support 3, so that the drive sections 17 lie in a common plane irrespective of the different diameters.

It is certainly possible to implement a positioning system 1 with a single x-drive gear 13a and a single y-drive gear 13b. Such a positioning system 1 will then have the structure illustrated in FIGS. 2 to 8, with the support module 7 shown here forming the whole of the slide support 3, which is conceived as a unit. The particular advantage of the positioning system 1, however, becomes evident if the slide support 3 is fitted with a plurality of x-drive gears 13a and/or with a plurality of y-drive gears 13b, preferably comprising both a plurality of x-drive gears 13a and a plurality of y-drive gears 13b. The latter applies to the embodiment illustrated in FIG. 1.

The positioning system 1 illustrated in FIG. 1 has the modular structure referred to above, with a plurality of support modules 7 fitted to one another in an x-y plane. Each of these support modules 7 has a base body 8a and two drive gears 13, one being an x-drive gear 13a and the other being a y-drive gear 13b. These two drive gears 13, 13a, 13b form a drive gear pair which preferably has an L-shaped configuration. The axis of rotation 14a of the x-drive gear 13a lies on one L-leg, while the axis of rotation 14b of the y-drive gear 13b lies on the other L-leg of the L-shape configuration. At the same time, an axial end region 33a of the x-drive gear 13a is arranged adjacent to an axial end region 33b of the x-drive gear 13b.

The two drive gears 13 are preferably placed within the outline of the base body 8a in such a way that each drive gear 13 extends adjacent to and along one of two lateral outer surfaces 12 of the base body 8a, which meet in a corner region of the base body 8a.

The region between the two drive gears 13, 13a, 13b can be used to optimum advantage for the accommodation of the drive means 28.

The various support modules 7 are expediently identical in design. In addition, they are preferably lined up in such a way that their drive gears 13 are aligned identically.

Within the slide support 3, the drive gears 13 are preferably arranged in such a way that they produce a plurality of rows of x-drive gears 13a and y-drive gears 13b which extend at right angles to one another. In this way, the slide support 3 expediently has a plurality of gear rows which extend in the x-axis direction and are spaced from one another in the y-axis direction, and the drive gears 13 of which consist of y-drive gears 13b arranged axially consecutively with coaxial longitudinal axes. In a comparable way, the slide support 3 has a plurality of gear rows which extend in the y-axis direction and are spaced from one another in the x-axis direction, and which consist of x-drive gears 13a likewise arranged coaxially and at a distance from one another within the respective gear row.

In a modular structure, such an arrangement can be obtained by lining up identically designed support modules 7 two-dimensionally with the same orientation.

The design of the slide support 3 with multiple drive gears 13 has the advantageous effect that the positioning slide 2 can be moved within a very large positioning area. One and the same positioning slide 2 can change its cooperation in driving the individual drive gears 13. This means that the positioning slide 2 can, in a manner of speaking, be transferred between individual drive gears 13 in its positioning movement 4. This enables the positioning slide 2 to cover longer distances on various courses, facilitating a particularly flexible application of the positioning system 1.

FIG. 1 illustrates how the slide support 3 can define one or more transfer stations 42 at the edges. If the slide support 3 is modular in design, each transfer station 42 is expediently defined by one of the support modules 7. A transfer station 42 is represented by a feed station 42*a* in the illustrated embodiment, where a succession of positioning slides 2 can be fed onto the slide support 3 from outside the positioning system 1. Such positioning slides 2 have, for example, been loaded with one or more products outside the positioning system 1, and these products are, within the positioning system 1, moved by suitable traversing to workstations, where they will be machined or processed in any way required.

At least one further transfer station 42 can be an unloading station 42*b*, from which the positioning slide 2 loaded with one or more products or even unloaded positioning slides 2 can be removed.

When positioning within the positioning system 1, each positioning slide 2 can in principle be moved across all support modules 7 present.

If a slide support 3 is equipped with a plurality of x-drive gears 13*a* and/or y-drive gears 13*b* and the interaction of these drive gears 13 changes with the positioning slide 2, a suitable monitoring system is expediently provided for a smooth transfer of the positioning slide 2 between the individual drive gears 13 and for ensuring that the current position of the positioning slide 2 is known, so that the desired positioning movement 4 of the positioning slide 2 can be generated by selective control of the drive gears 13.

The drive means 28 are expediently provided with a suitable sensor system which allows for conclusions to be drawn regarding the current rotary position of the associated drive gear 13, in order to drive and position a positioning slide 2 as desired on the basis of this information. In a modular structure, each support module 7 can expediently be controlled individually for performing the desired positioning movements.

The support modules 7 can be or are expediently interconnected at least electrically in order to enable energy and/or data and/or signals to be transmitted, which is required for the positioning movement 4 of a positioning slide 2 in particular. FIG. 1 indicates by dotted lines such a network 34, which is coupled to an external electronic control unit not shown in detail, and by which all support modules 7 are electrically interconnected. If the slide support 3 is not modular, all existing drive means 28 and any sensor means provided can also be interconnected with the aid of such a network 34 for implementing a central control and retrieval function.

Within the slide support 3, decentralised electronic control units 35 can be provided, of which one is indicated by broken lines in FIG. 1 and each of which is responsible for the electric control of the drive means 28 of some of the drive gears 13 provided. One x-drive gear 13*a* and one y-drive gear 13*b* are preferably combined functionally to form a pair of drive gears which cooperates with its own decentralised electronic control unit 35, which is incorporated into the network 34.

In a modular structure, each support module 7 expediently comprises such a decentralised electronic control unit 35.

In combination with a modular slide support 3, each support module 7 is expediently assigned suitable electromechanical interfacing means which facilitate a simple coupling for establishing the desired network connection when assembling the slide support 3.

At one or more points, the slide support 3 can be equipped with sensor means for detecting the position of the at least one positioning slide 2, expediently separately for the current position in the x-axis direction and the current position in the y-axis direction. Suitable position sensing means can operate on an optical basis in particular.

Depending on their design, the positioning slides 2 can be used for carrying products to be fed directly to a defined purpose, or for receiving separate product support means which can be loaded with products. A possible application is the use of the positioning slide 2 for carrying so-called micro-titre plates used in laboratory automation for storing fluid samples. Irrespective of how a positioning slide 2 can be or is loaded with one or more products, the positioning slide 2—in particular its underside 18—can be provided with a readable code which facilitates product identification and which can be read by an identification device which may, for example, be placed on the slide support 3 at a defined point or at several points. Such a coding can also be used for position checking.

In large conveying systems, in particular, the positioning system 1 can also be provided with RFID identification means, in particular in the region of a feed station 42*a* and an unloading station 42*b*.

The positioning system 1 can also be provided with electronic means facilitating the running of a teach mode. At one or more points of the slide carrier 3, for example, micro-switches can be provided which activate a teach mode on the approach of a positioning slide 2 and inform a control software of the current position of the positioning slide 2.

One of the advantages of the positioning system 1 lies in the fact that the positioning area usable for the positioning of the positioning slide 2 can be considerably larger than the base area of the slide support 3. In this way, relatively little space is required for constructing the positioning system 1.

With the aid of the positioning system 1, a compact three-dimensional product storage system can be implemented as well. Several positioning systems 1 can, for example, be placed vertically on top of and at a distance from one another in the manner of a rack system, each being capable of accommodating a greater number of positioning slides 2. These positioning slides 2 may in this case, for example, act as storage pallets, which can be stored and retrieved as required. With the aid of a lifting device, the positioning systems 1 arranged in several tiers can easily be approached from the side.

The invention claimed is:

1. A positioning system comprising at least one positioning slide which is variably traversable and positionable relative to a slide support of the positioning system while performing a positioning movement in a positioning plane defined by a Cartesian x-y coordinate system, wherein the slide support comprises at least one y-drive gear which can be driven by drive means of the positioning system to perform a drive rotary movement about an axis of rotation parallel to the x-axis of the coordinate system and at least one x-drive gear which can be driven by drive means to perform a drive rotary movement about an axis of rotation parallel to the y-axis of the coordinate system, wherein each y-drive gear and each x-drive gear has a drive toothing at its outer circumference and wherein the positioning slide has a driven toothing structure with which it is simultaneously in tooth engagement with the drive toothing of at least one x-drive gear and at least one y-drive gear during the positioning movement and can be driven to perform a positioning movement in the x-axis direction of the x-y coordinate system by rotating the respective x-drive gear and to perform a positioning movement in the y-axis direction of the x-y coordinate system by rotating the respective y-drive gear, and wherein the driven toothing structure of the positioning slide comprises a plurality of driven teeth distributed in a punctiform fashion in a plane parallel to the positioning plane, which are placed in a two-dimensional tooth matrix at the intersection points of mutually perpendicular x-grid lines and y-grid lines of an imaginary cross grid, wherein at least several of the driven teeth of the tooth matrix are capable of coming into tooth engagement with both the at least one x-drive gear and the at least one y-drive gear during the positioning movement of the positioning slide.

2. A positioning system according to claim 1, wherein each driven tooth of the tooth matrix is designed to be capable of coming into tooth engagement with both the at least one x-drive gear and the at least one y-drive gear during the positioning movement of the positioning slide.

3. A positioning system according to claim 1, wherein the x-grid lines have the same distance from one another as the y-grid lines.

4. A positioning system according to claim 1, wherein the at least one positioning slide has an underside facing the slide support, the driven toothing structure being located on this underside.

5. A positioning system according to claim 1, wherein the at least one positioning slide rests with its driven toothing structure on the drive toothings of the drive gears.

6. A positioning system according to claim 1, wherein the at least one positioning slide is designed as a product support which can be loaded directly or indirectly with at least one product to be positioned.

7. A positioning system according to claim 1, wherein the at least one positioning slide has a rectangular outline and/or is designed to be plate-shaped.

8. A positioning system according to claim 1, wherein the tooth matrix of the driven toothing structure has four edge regions extending at right angles to one another.

9. A positioning system according to claim 8, wherein the tooth matrix is unbounded in all four edge regions.

10. A positioning system according to claim 1, wherein all drive gears of the slide support have the same diameter, their axes of rotation lying in a common axes plane which is parallel to the positioning plane.

11. A positioning system according to claim 1, wherein the slide support is equipped with a plurality of x-drive gears and/or with a plurality of y-drive gears.

12. A positioning system according to claim 1, wherein the slide support is equipped with at least one pair of drive gears consisting of an x-drive gear and a y-drive gear, wherein these two drive gears are arranged parallel to the positioning plane in an L-shaped configuration, an axial end region of the x-drive gear being placed adjacent to an axial end region of the y-drive gear.

13. A positioning system according to claim 1, wherein the slide support is provided with separate drive means for each drive gear.

14. A positioning system according to claim 13, wherein the separate drive means of the slide support are of an electromotive design.

15. A positioning system according to claim 1, wherein the drive gears of the slide support can be driven to rotate independently of one another by their assigned drive means.

16. A positioning system according to claim 1, wherein the slide support is composed of a plurality of support modules, which can be or are lined up in a modular fashion in the x-axis direction and/or in the y-axis direction, and each of which comprises at least one x-drive gear and at least one y-drive gear with respectively associated drive means, wherein one and the same positioning slide can be traversed across several and expediently across all of the support modules in its positioning movement.

17. A positioning system according to claim 16, wherein the support modules can be or are interconnected to allow a transmission of energy and/or data and/or signals as required for their operation.

18. A positioning system according to claim 1, wherein the base area of the driven toothing structure, which contains the tooth matrix, of at least one positioning slide, is larger than the base area of the slide support or of each support module.

19. A positioning system according to claim 1, wherein the slide support defines at the edges at least one transfer station suitable for moving the slide support to the positioning slide and/or for removing the positioning slide from the slide support.

20. A positioning system according to claim 1, wherein the driven toothing structure of the positioning slide comprises a plurality of groove-like x-recesses which extend in the x-axis direction and are arranged side by side at a distance from one another in a plane parallel to the positioning plane and a plurality of groove-like y-recesses which extend in the y-axis direction and are arranged side by side at a distance from one another in a plane parallel to the positioning plane, the x-recesses and the y-recesses intersecting at right angles while laterally flanking the driven teeth belonging to the two-dimensional tooth matrix.

* * * * *